Oct. 30, 1962     D. J. McCULLOCH ET AL     3,060,803
METALLIC SPECTACLE FRAME SUPPORTING INTEGRAL
PLASTIC LENS RIMS AND NOSE PADS
Filed July 27, 1959
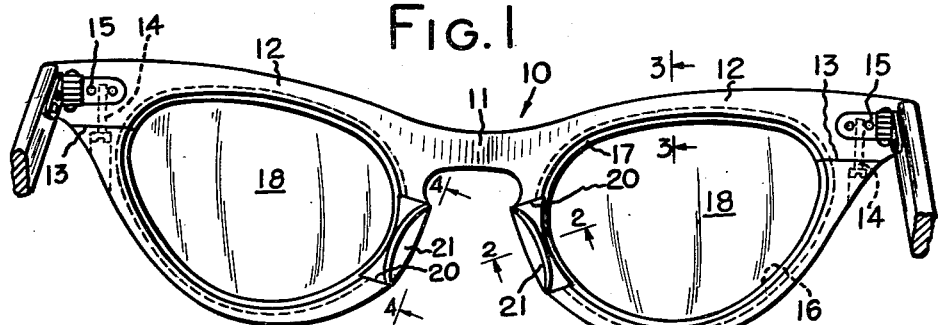
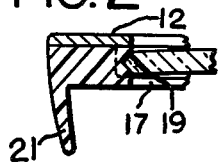 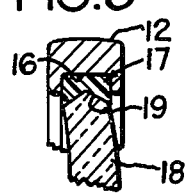 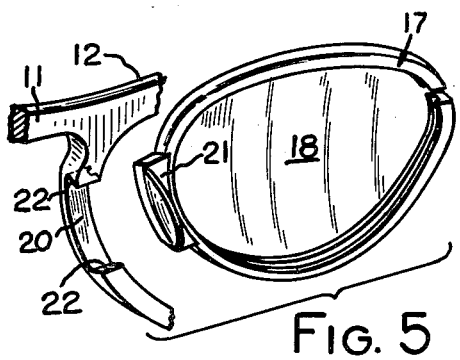
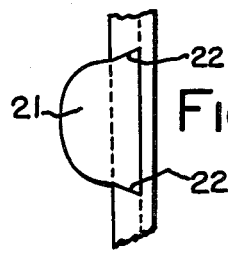
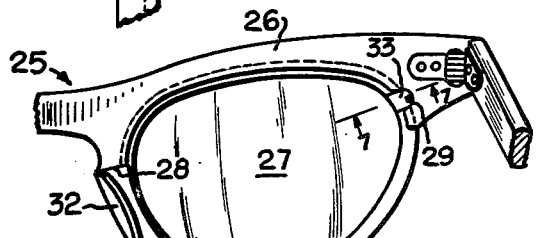 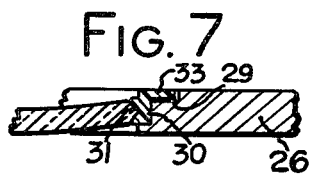
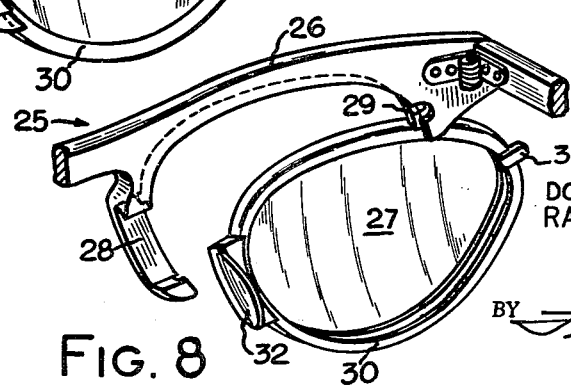
DONALD J. McCULLOCH
RAYMOND F. E. STEGEMAN
INVENTORS
BY *Frank C. Parker*
ATTORNEY

United States Patent Office 3,060,803
Patented Oct. 30, 1962

3,060,803
METALLIC SPECTACLE FRAME SUPPORTING INTEGRAL PLASTIC LENS RIMS AND NOSE PADS
Donald J. McCulloch and Raymond F. E. Stegeman, Greece, N.Y., assignors to Bausch & Lomb Incorporated, a corporation of New York
Filed July 27, 1959, Ser. No. 829,822
1 Claim. (Cl. 88—47)

The present invention relates generally to spectacle frames and is more particularly concerned with an improvement in metal spectacle frames.

Over the past several years there has been a trend toward eyeglass frames of lightweight plastic, such as Zylonite, and more recently there has been a tendency to utilize anodized aluminum for such frames.

The plastic frames have been accepted quite generally by the public as they are relatively light in weight, sufficiently resilient to afford some protection to the glass lenses against breakage and generally quite comfortable for the wearer. The metal frames manufactured of anodized aluminum have followed the general style lines of the plastic frames but the anodized aluminum frames have been found to be somewhat less comfortable to the wearer. Accordingly, an object of the present invention is to provide an eyeglass frame made principally of a lightweight metal, such as anodized aluminum, in order to provide strength and to facilitate the styling and coloring of the frames, but with plastic inserts having integral plastic nose pads to render the frames more comfortable to the wearer.

A more specific object of the present invention is to provide a lightweight aluminum frame with inserted plastic lens rims having integral plastic nose pads.

One of the principal advantages of the present invention is that the frames can be made in a wide variety of colors due to the versatility of the metal that is utilized without sacrificing the comfort features of the plastic due to both its resilience and its tendency to resist heat transfer which is particularly desirable in those parts of the frames which actually touch the wearer, such as the nose pads.

The foregoing objects and advantages as well as numerous others will be more apparent from the following detailed description of the present invention wherein:

FIG. 1 is an inside plan view of a first embodiment of the invention;

FIG. 2 is a sectional view taken substantially along the line 2—2 in FIG. 1 and looking in the direction of the arrows;

FIG. 3 is a sectional view taken substantially along the line 3—3 in FIG. 1 and looking in the direction of the arrows;

FIG. 4 is a fragmentary view of one of the nose pads;

FIG. 5 is a fragmentary exploded view of a portion of the frame and one of the plastic lens rims;

FIG. 6 is a fragmentary inside plan view of a second embodiment of the present invention;

FIG. 7 is a sectional view taken substantially along the line 7—7 in FIG. 6 and looking in the direction of the arrows; and FIG. 8 is an exploded view of the frame member and lens rim of FIG. 6.

With reference now to the drawings wherein like reference numerals have been used in the different views to identify identical parts, and referring first to the embodiment of the invention shown in FIGS. 1, 2 and 3, a spectacle frame is shown in FIG. 1 and is represented generally by reference numeral 10. The spectacle frame 10 is formed of metal, preferably anodized aluminum, which may be substantially any desired color. The spectacle frame 10 includes a nasal arch 11 and a pair of lens encircling or supporting portions 12. The lens encircling or supporting portions 12 are split at the temporal region, as indicated by reference numerals 13, and are held together at the splits 13 by means of screws 14 respectively disposed within drilled and threaded openings formed in the ends of the frame on opposite sides of the split 13. Suitable temples are hingedly fixed to the frame 10 by means of appropriate hinges 15.

The lens encircling portions 12 are each formed with a peripheral groove or channel 16 for receiving a plastic lens rim 17 within which lenses 18 are mounted. The plastic lens rims are themselves split at the temporal region and are formed with a pheripheral groove 19 for rigidly seating the beveled edges of lenses 18 within the plastic rims. Each of the nasal portions of the lens encircling members 12 is provided with a cutout region 20 for receiving a plastic nose pad 21, which plastic nose pad is integrally formed with the plastic lens rim 17. The metallic lens supporting portion 12 in the region of the cutout 20 is formed across the rear face thereof with at least one tapered side 22 which insures that the nose pad 21 will be securely held in place within the lends encircling portion 12.

In assembling the lenses in the frame 10, the plastic lens rims 17 and the lens encircling portion 12 are opened to make it possible to insert the lenses 18 therein. Thereafter, the lens encircling portions 12 and the plastic lens rims are tightened around the lenses by the screws 14 in order to clamp the entire assembly together.

Reference should now be had to the embodiment of the invention shown in FIGS. 6, 7 and 8. In this form, the metallic spectacle frame is designated by reference numeral 25 and comprises a pair of lens mounting portions 26 which do not completely encircle the lenses 27. In the form of the invention shown in FIGS. 6, 7 and 8 each metallic lens mounting portion 26 is formed in the nasal region thereof with notches 28 similar to the notches 20 on the inside of the frame. A second notch is formed in each lens mounting portion at the temporal region, this notch being identified by reference numeral 29. As in the first embodiment of the invention plastic lens rims 30 having a peripheral groove 31 are provided for mounting the lenses 27 and in addition to integral nose pads 32 which seat within notches 28, each of the lens rims 30 is provided with a projection 33 adapted to be received within the notches 29. The projections 33 and the nose pads 32 together function to retain the plastic lens rims and lenses 27 in assembly with the frames 25.

When it is desired to assemble the lenses 27 with the frames 25, the plastic lens rims 30 may be heated or not depending on the flexibility of the plastic material used, to enable them to flex sufficiently to receive the lenses 27 and once the lenses 27 are inserted within the lens rims 30, the lens rims 30 and lenses 27 will be retained in assembly with the frame 25 due to the action of the nose pads 32 and the retaining projections 33.

In each of the embodiments of the invention, as disclosed herein, the desirable features of the plastic nose pads which touch the face of the wearer are utilized and the desirable features of the metallic frames are likewise utilized. The combination of plastic lens rims and nose pads and metallic frames provides a unique improvement in spectacle frames and it is contemplated that numerous changes may be made in the structural details of the spectacle frames disclosed herein without departing from the spirit or the scope of the invention.

What is claimed is:

In spectacles characterized by a massive metallic frame having an opening wherein an ophthalmic lens is held by a peripheral metallic rim portion surrounding the opening, the combination of a plastic lens rim which is fitted within a groove around the inner surface of said opening and is interposed under compressive stress between the edge of said lens and said inner surface to retain the lens, a plastic nose pad anchor block integrally formed on the nasal side of said plastic lens rim so as to extend substantially radially therefrom, a nose pad integrally formed on said block on the side opposite to the plastic rim, a pair of mutually spaced and inclined unidirectional holding surfaces formed in dovetail fashion on opposite sides of said block, and a corresponding pair of mutually inclined holding surfaces formed along the sides of a cutout which is recessed into the rear face of said rim portion and extends from said opening to the exterior nasal side of said peripheral rim portion, the last-named surfaces being fitted to slidably engage the holding surfaces of said anchor block whereby the block is retained in said cutout by a dovetail connection and is prevented from longitudinal motion therein by its unity with said plastic lens rim.

References Cited in the file of this patent

UNITED STATES PATENTS

| | | |
|---|---|---|
| 2,471,338 | Massaro | May 24, 1949 |
| 2,727,436 | Prince | Dec. 20, 1955 |
| 2,756,631 | Page | July 31, 1956 |
| 2,914,986 | Zakin | Dec. 1, 1959 |

FOREIGN PATENTS

| | | |
|---|---|---|
| 101,803 | Australia | Aug. 9, 1937 |
| 518,938 | Great Britain | Mar. 12, 1940 |